United States Patent [19]

Kono et al.

[11] Patent Number: 5,678,667
[45] Date of Patent: Oct. 21, 1997

[54] SLIP CONTROL APPARATUS FOR MOTOR VEHICLE LOCK-UP CLUTCH

[75] Inventors: Katsumi Kono, Toyota; Shinya Nakamura, Owariasahi, both of Japan

[73] Assignee: Toyota Jidosha Kabushiki Kaisha, Toyota, Japan

[21] Appl. No.: 762,994

[22] Filed: Dec. 10, 1996

Related U.S. Application Data

[62] Division of Ser. No. 503,744, Jul. 18, 1995, Pat. No. 5,613,583.

Foreign Application Priority Data

Jul. 20, 1994 [JP] Japan ........................ 6-168177
Jul. 13, 1995 [JP] Japan ........................ 7-177354

[51] Int. Cl.⁶ ............................................. F16H 61/14
[52] U.S. Cl. ...................... 192/3.31; 477/65; 477/169; 477/176
[58] Field of Search .............................. 192/3.29, 3.3, 192/3.31, 103 F; 477/169, 176, 64, 65; 475/65; 74/732.1

[56] References Cited

U.S. PATENT DOCUMENTS

| | | | |
|---|---|---|---|
| 4,468,988 | 9/1984 | Hiramatsu | 477/176 X |
| 4,582,185 | 4/1986 | Grimes et al. | 192/3.31 X |
| 4,940,122 | 7/1990 | Fujieda | 192/3.31 |
| 4,947,734 | 8/1990 | Fujita et al. | 477/169 X |
| 4,953,677 | 9/1990 | Aoki et al. | 192/3.3 |
| 5,105,926 | 4/1992 | Yoshimura et al. | 477/169 |
| 5,527,233 | 6/1996 | Tabata et al. | 477/906 X |

FOREIGN PATENT DOCUMENTS

| | | |
|---|---|---|
| 62-7430 | 2/1987 | Japan . |
| 1-176854 | 7/1989 | Japan . |

*Primary Examiner*—Richard M. Lorence
*Attorney, Agent, or Firm*—Oblon, Spivak, McClelland, Maier & Neustadt, P.C.

[57] ABSTRACT

An apparatus including a slip control device for controlling an amount of slip of a lock-up clutch disposed between pump and turbine impellers in a power transmission system of a motor vehicle, a slip-parameter monitoring device for detecting the actual slip speed of the lock-up clutch or a control error between actual and target slip speeds of the lock-up clutch, a summing device for obtaining a sum of values of the actual slip speed or control error detected by the slip-parameter monitoring device for a predetermined period of time, and a defect detecting device for determining the presence or absence of a defect in slip control of the lock-up clutch by the slip control device, on the basis of the sum as compared with a predetermined reference. The slip-parameter monitoring device and summing device may be respectively replaced by a speed-parameter monitoring device for detecting a speed-related parameter which varies due to hunting in slip control of the lock-up clutch by the slip control device, and a smoothing device for smoothing the speed-related parameter. In this case, the hunting detecting device determines the presence or absence of the hunting defect on the basis of a difference of the speed-related parameter from its smoothed value.

5 Claims, 15 Drawing Sheets

| SHIFT POSITION | | SOLENOID VALVES | | C1 | C2 | B1 | B2 | F1 | B3 | F2 | C0 | F0 | B0 |
|---|---|---|---|---|---|---|---|---|---|---|---|---|---|
| | | S1 | S2 | | | | | | | | | | |
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | ○ | ○ | ○ | |
| D | 2nd | ○ | ○ | ○ | | | ○ | | | | ○ | ○ | |
| D | 3rd | × | ○ | ○ | ○ | | ○ | ○ | | | ○ | ○ | |
| D | O/D | × | × | ○ | ○ | | ○ | | | | | | ○ |
| S | 1st | ○ | × | ○ | | | | | | ○ | ○ | ○ | |
| S | 2nd | ○ | ○ | ○ | | | ○ | | | | ○ | ○ | |
| S | 3rd | × | ○ | ○ | ○ | | ○ | ○ | | | ○ | ○ | |
| S | (O/D) | × | × | ○ | ○ | | ○ | | | | | | ○ |
| L | 1st | ○ | × | ○ | | ○ | | | ○ | ○ | ○ | ○ | |
| L | 2nd | ○ | ○ | ○ | | ○ | ○ | ○ | | | ○ | ○ | |

FIG. 2

SLIP CONTROL APPARATUS FOR MOTOR VEHICLE LOCK-UP CLUTCH

This is a Division of application Ser. No. 08/503,744 filed on Jul. 18, 1995 now U.S. Pat. No. 5,613,583.

BACKGROUND OF THE INVENTION

1. Field of the Invention

The present invention relates to an apparatus for controlling the amount of slip of a lock-up clutch provided in a power transmitting system of a motor vehicle

2. Discussion of the Related Art

In a motor vehicle having a fluid-filled power transmitting device equipped with a lock-up clutch, such as a torque converter or fluid coupling incorporating such a lock-up clutch, it is proposed to control the lock-up clutch in a slip control mode (partially slipping mode) such that an actual amount of slip (slip speed) of the lock-up clutch, namely, a difference between the speeds of a pump impeller and a turbine impeller eventually coincides with a predetermined target slip speed, for the purpose of improving the fuel economy of the vehicle while minimizing the power loss due to slipping of the lock-up clutch. the slip control mode is established when the running condition of the vehicle is in a predetermined slip control area which is intermediate between a fully releasing area in which the lock-up clutch should be held in a fully released state, and a fully engaging area in which the lock-up clutch should be held in a fully engaged state. These fully releasing, fully engaging and slip control areas are defined by suitable parameters (e.g., throttle valve opening and vehicle running speed) indicative of the vehicle running condition.

Generally, a lock-up clutch whose slip speed or amount is adjustable is provided with a piston which is operated by a hydraulic pressure source that permits full engagement of the lock-up clutch. Described in detail, the piston is moved depending upon a difference between hydraulic pressures in two oil chambers, which are formed on the opposite sides of the piston. The amount of slip of the lock-up clutch is controlled by controlling the pressure difference of the two oil chambers to thereby change a thrust force acting on the piston and the resulting friction force of the clutch. Since the hydraulic pressure source that permits the full engagement of the lock-up clutch is utilized to control the clutch in the slip control mode, even a small amount of change in the pressure difference of the two oil chambers will result in a considerable amount of change in the slip amount of the lock-up clutch. That is, the slip amount of the clutch controlled in a feedback fashion tends to be excessively sensitive to a change in a slip control signal or output generated by a feedback control system. In view of this drawback, the slip control output for controlling the amount of slip of the lock-up clutch is according to a control equation which includes a feed-forward control value, a feedback control value and a learning control value.

A slip control apparatus as described above includes slip control means for controlling the amount of slip of the lock-up clutch in the slip control mode, diagnosing means for detecting a defect, abnormality or failure associated with the slip control of the lock-up clutch by the slip control means, and slip control terminating means for commanding the slip control means to terminate the slip control of the clutch when any defect associated with the slip control is detected by the diagnosing means. For instance, it is proposed to terminate the slip control of the lock-up clutch and place the clutch in the fully released state if the slip speed of a torque converter (difference between the input shaft speed and the output shaft speed of the torque converter) is held outside a permissible or normal range for more than a predetermined length of time. An example of such slip control apparatus is disclosed in JP-B-62-7430.

In the conventional slip control apparatus described above, however, the slip control of the lock-up clutch is not terminated if the slip speed of the torque converter changes at random or vibrates along a waviness curve such that the slip speed instantaneously exceeds the predetermined threshold value. In such situation, too, the slip control of the lock-up clutch is considered defective, even though the time period during which the slip speed of the torque converter is kept outside the normal range does not exceed the predetermined length of time. In other words, the diagnosing means does not permit highly reliable detection of a defect, abnormality or failure associated with the slip control.

SUMMARY OF THE INVENTION

It is therefore an object of the present invention to provide an apparatus which includes slip control means for controlling the amount of slip of a lock-up clutch in a power transmitting device of a motor vehicle, and which permits highly reliable detection of a defect, abnormality or failure associated with the slip control of the lock-up clutch by the slip control means.

The above object may be achieved according to a first aspect of the present invention, which provides an apparatus including slip control means for controlling an amount of slip of a lock-up clutch disposed between a pump impeller and a turbine impeller in a power transmission system of a motor vehicle, such that an actual slip speed of the lock-up clutch coincides with a target slip speed, the apparatus comprising: (a) slip-parameter monitoring means for detecting a selected slip-related parameter at a predetermined interval while the slip control means is in operation, the slip-related parameter being selected from the group consisting of the actual slip speed of the lock-up clutch and a control error between the actual and target slip speeds of the lock-up clutch; (b) summing means for obtaining a sum of values of the selected slip-related parameter detected by the slip-parameter monitoring means; and (c) defect detecting means for determining the presence or absence of a defect in slip control of the lock-up clutch by the slip control means, on the basis of the sum as compared with a predetermined reference.

In the slip control apparatus constructed according to the first aspect of this invention as described above, a suitable slip-related parameter such as the actual slip speed of the lock-up clutch or a control error between the actual and target slip speeds is detected by the slip-parameter monitoring means at a predetermined interval during slip control of the lock-up clutch by the slip control means. In the meantime, a sum of values of the slip=related parameter detected at the predetermined interval for a predetermined period of time is obtained by the summing means. On the basis of the sum as compared with a predetermined reference, the presence or absence of a defect associated with the slip control of the clutch is determined by the defect detecting means.

In the present apparatus wherein the defect in the slip control of the lock-up clutch by the slip control means is detected on the basis of the sum of the actual slip speed values or control error values which are detected from time to time, the defect can be detected even when the slip speed changes at random or vibrates along a waviness curve, that is, even where the time period during which the slip speed is held outside a permissible or normal range does not exceed a predetermined time.

In one preferred form of the apparatus, the slip-parameter monitoring means detects the actual slip speed of the lock-up clutch and the summing means obtains a sum of values of the actual slip speed detected by the slip-parameter monitoring means. In this case, the defect detecting means determines the presence of an excessive amount of engagement of the lock-up clutch as the defect if the sum of values of the actual slip speed is smaller than a predetermined reference. The actual slip speed of the lock-up clutch may be replaced by the control error.

In another preferred form of the apparatus, the slip-parameter monitoring means detects the control error and the summing means obtains a sum of values of the control error detected by the slip-parameter monitoring means. In this case, the defect detecting means determines the presence of an excessive release of the lock-up clutch as the defect if the sum of values of the control error is larger than a predetermined reference. The control error may be replaced by the actual slip speed of the lock-up clutch.

It will be obvious that the apparatus may be adapted such that the slip-parameter monitoring means detects both the actual slip speed of the lock-up clutch and the control error, while the summing means obtains both the sum of the actual slip speed values and the sum of the control error values, and the defect detecting means determines the presence of the excessive engagement defect of the slip control of the clutch if the sum of the actual slip speed values is smaller than the predetermined reference, and the presence of the excessive release defect of the slip control if the sum of the control error values is larger than the predetermined reference.

In a still further preferred form of the invention, the apparatus further comprises enabling means (d) for enabling the defect detecting means to operate if a slip control output of the slip control means which determines the amount of slip of the lock-up clutch falls within a predetermined range. This arrangement assures improved reliability of determination by the defect detecting means, since the defect detecting means is permitted to operate only when the slip control output of the slip control means is held within the predetermined range.

The object indicated above may also be achieved according to a second aspect of this invention, which provides an apparatus including slip control means for controlling an amount of slip of a lock-up clutch disposed between a pump impeller and a turbine impeller in a power transmission system of a motor vehicle, such that an actual slip speed of the lock-up clutch coincides with a target slip speed, the apparatus comprising: (e) speed-parameter monitoring means for detecting a selected speed-related parameter which varies due to hunting in slip control of the lock-up clutch by the slip control means, while the slip control means is in operation; (f) smoothing means for smoothing the speed-related parameter detected by the speed-parameter monitoring means, to obtain a smoothed speed-related value; and (g) hunting detecting means for determining the presence or absence of a hunting defect in slip control of the lock-up clutch by the slip control means, on the basis of a difference of the speed-related parameter from the smoothed speed-related value.

In the slip control apparatus constructed according to the second aspect of the invention as described above, the speed-related parameter which varies due to hunting in the slip control of the lock-up clutch by the slip control means is detected by the speed-parameter monitoring means while the slip control means is in operation. The detected speed-related parameter is smoothed to the smoothed speed-related value. On the basis of a difference of the speed-related parameter from the smoothed speed-related value, the presence or absence of the hunting defect is determined by the hunting detecting means.

According to this aspect of the invention wherein the hunting detecting means operates on the basis of the difference or variation of the speed-related parameter with respect to the smoothed value, the hunting defect may be detected even when the actual slip speed vibrates or even where the time period during which the actual slip speed is held outside the normal range is shorter than the predetermined time.

The speed-related parameter which is detected by the speed-parameter monitoring means may be selected from the group consisting of: a speed of an engine of the vehicle connected to the pump impeller; the actual slip speed of the lock-up clutch; and a control error between the actual and target slip speeds of the lock-up clutch.

The object indicated above may also be achieved according to a third aspect of this invention, which provides an apparatus including slip control means for controlling an amount of slip of a lock-up clutch disposed between a pump impeller and a turbine impeller in a power transmission system of a motor vehicle, such that an actual slip speed of the lock-up clutch coincides with a target slip speed, the apparatus comprising: (h) engine speed variation determining means for determining whether an amplitude of variation of a speed of an engine of the vehicle connected to the pump impeller is larger than a predetermined first reference; (i) turbine speed variation determining means for determining whether an amplitude of variation of a speed of the turbine impeller is larger than a predetermined second reference; and (j) hunting detecting means for determining the presence of a hunting defect in slip control of the lock-up clutch by the slip control means, if the engine speed variation determining means determines that the amplitude of variation of the speed of the engine is larger than the predetermined first reference while the turbine speed variation determining means determines that the amplitude of variation of the speed of the turbine impeller is not larger than the predetermined second reference.

In the slip control apparatus constructed according to the third aspect of this invention, the hunting detecting means determines the presence of a hunting defect in the slip control of the lock-up clutch, if it is determined by the engine speed variation determining means that the amplitude of variation of the engine speed is larger than the predetermined first reference while it is determined by the turbine speed variation determining means that the amplitude of variation of the turbine impeller speed is not larger than the predetermined second reference.

According to this aspect of the invention wherein the hunting detecting means operates on the basis of the engine speed variation and the turbine speed variation, the hunting defect may be detected even when the actual slip speed vibrates or even where the time period during which the actual slip speed is held outside the normal range does not exceed the predetermined time.

In one preferred form of the apparatus according to the third aspect of the invention, wherein the turbine speed variation determining means comprises turbine speed obtaining means for obtaining the speed of the turbine impeller, slip speed obtaining means for obtaining the actual slip speed of the lock-up clutch, and variation determining means for determining whether an amplitude of variation of a sum of the speed of the turbine impeller and the actual slip speed is larger than a predetermined value. In this case, the hunting detecting means determines the presence of the hunting defect if the engine speed variation is excessive while the sum of the turbine impeller speed and the actual slip speed of the clutch is not excessive. This arrangement is effective to prevent erroneous determination of the hunting detect, which would be made due to a change of the target slip speed depending upon the running condition of the vehicle.

BRIEF DESCRIPTION OF THE DRAWINGS

The above and optional objects, features, advantages and technical significance of the present invention will be better understood by reading the following detailed description of presently preferred embodiments of the invention, when considered in conjunction with the accompanying drawings, in which:

FIG. 2 is a table indicating a relationship between the operating positions of an automatic transmission connected to the torque converter and the respective combinations of the operating states of first and second solenoid-operated valves of the slip control apparatus;

DETAILED DESCRIPTION OF THE PREFERRED EMBODIMENTS

Figure 1:
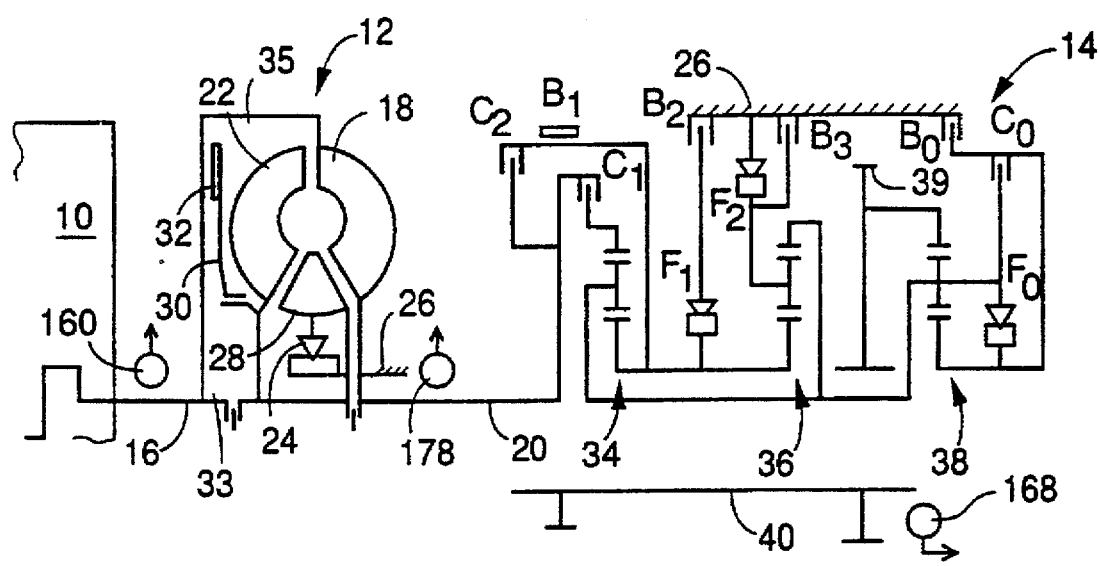
FIG. 1 is a schematic view illustrating a part of a power transmitting system of a motor vehicle, which incorporates a torque converter having a lock-up clutch to be controlled by a slip control apparatus according to the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

The torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft.20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18. The predetermined level of the pressure in the releasing oil chamber 33 indicated above is determined by a second term ("feed forward term") of a right member of an equation (2) which will be described.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st"), second-speed ("2nd"), third-speed ("3rd") and overdrive ("O/D") positions, and one backward drive position "R", as indicated in FIG. 2. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("1st", "2nd", "3rd" and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
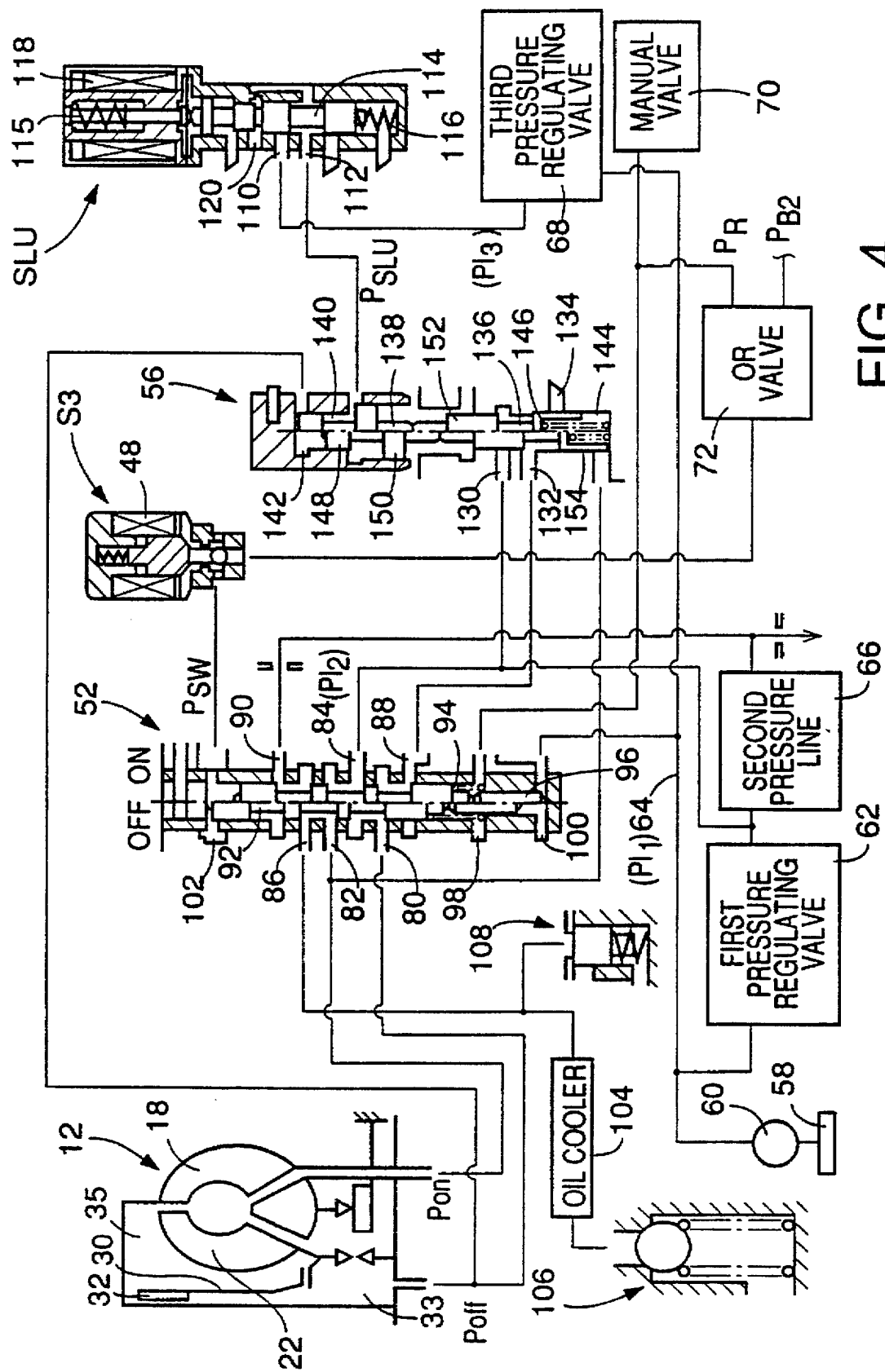
FIG. 4 is a view illustrating a part of a hydraulic control device shown in FIG. 3, which incorporates a circuit for controlling the lock-up clutch.
Figure 5:
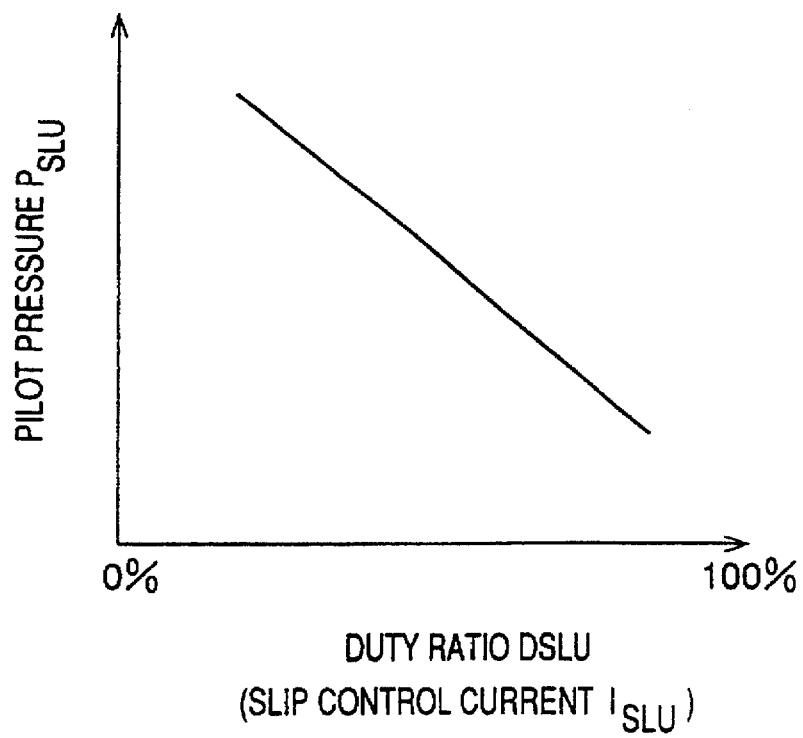
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 4B which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference $\Delta P$ between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening TAP of a first throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure pl2 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" ( PARKING), "R" (REVERSE) "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil cheer 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil cheer 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil cheer 102, and the spool 92 is moved by a force based on the pressure $P_{SW}$ against the biasing force of the spring 94 and the force based on the first line pressure Pl1 in the oil chamber 100, whereby the input port 84 communicates with the engaging port 82 while the first and second drain ports 86, 88 communicate with the supply and releasing ports 90, 80, respectively. As a result, the pressure Pon in the engaging oil chamber 35 is made higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve opening direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second 10 drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference ΔP (=Pon–Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference ΔP.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil cheer 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference ΔP (=Pon–Poff) on the opposite sides of the piston 30 of the lock-up clutch 32 is controlled depending upon the SLIP CONTROL pilot pressure $P_{SLU}$ generated by the linear solenoid valve SLU. The pressure difference ΔP changes with the pilot pressure $P_{SLU}$ as shown in FIG. 6, at a rate or gradient represented by a value (A2–A1)/A1 included in the following equation (1):

$$\Delta P = Pon - Poff = [(A2-A1)/A1]P_{SLU} - Fs/A1 \quad (1)$$

where, Fs: biasing force of the spring 146.

Figure 6:
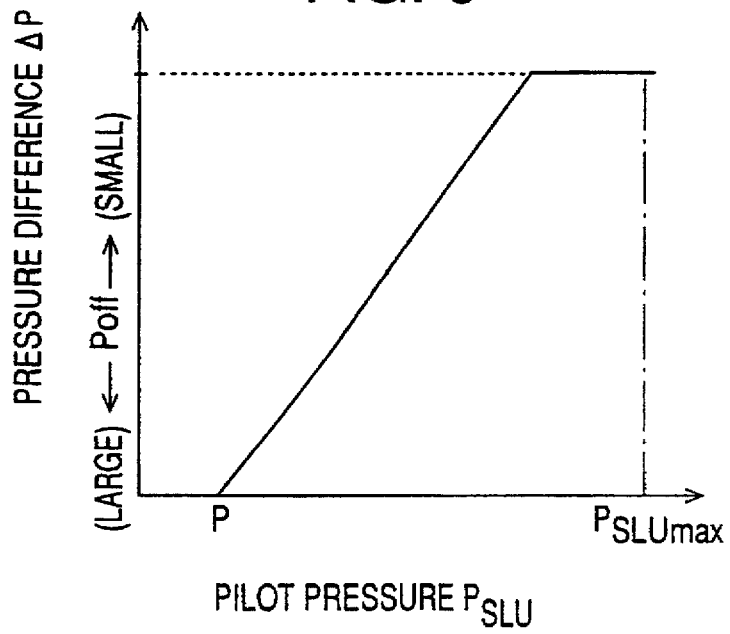
FIG. 6 is a graph indicating an output characteristic of a lock-up clutch control valve provided in the lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The graph of FIG. 6 indicates the output characteristic of the lock-up clutch control valve 56, namely, the relationship between the pressure difference ΔP generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference ΔP of the engaging and releasing oil chambers 35, 33, and thereby causes a decrease in a slip speed $N_{SLP}$ of the lock-up clutch 32, while a decrease in the pilot pressure $P_{SLU}$ causes an increase in the slip speed $N_{SLP}$. The slip speed $N_{SLP}$ is a difference ($N_P-N_T$) between a speed $N_P$ of the pump impeller 18 (speed $N_E$ of the engine 10) and a speed $N_T$ of the turbine impeller 22 (speed Nin of the input shaft 20).

Figure 3:
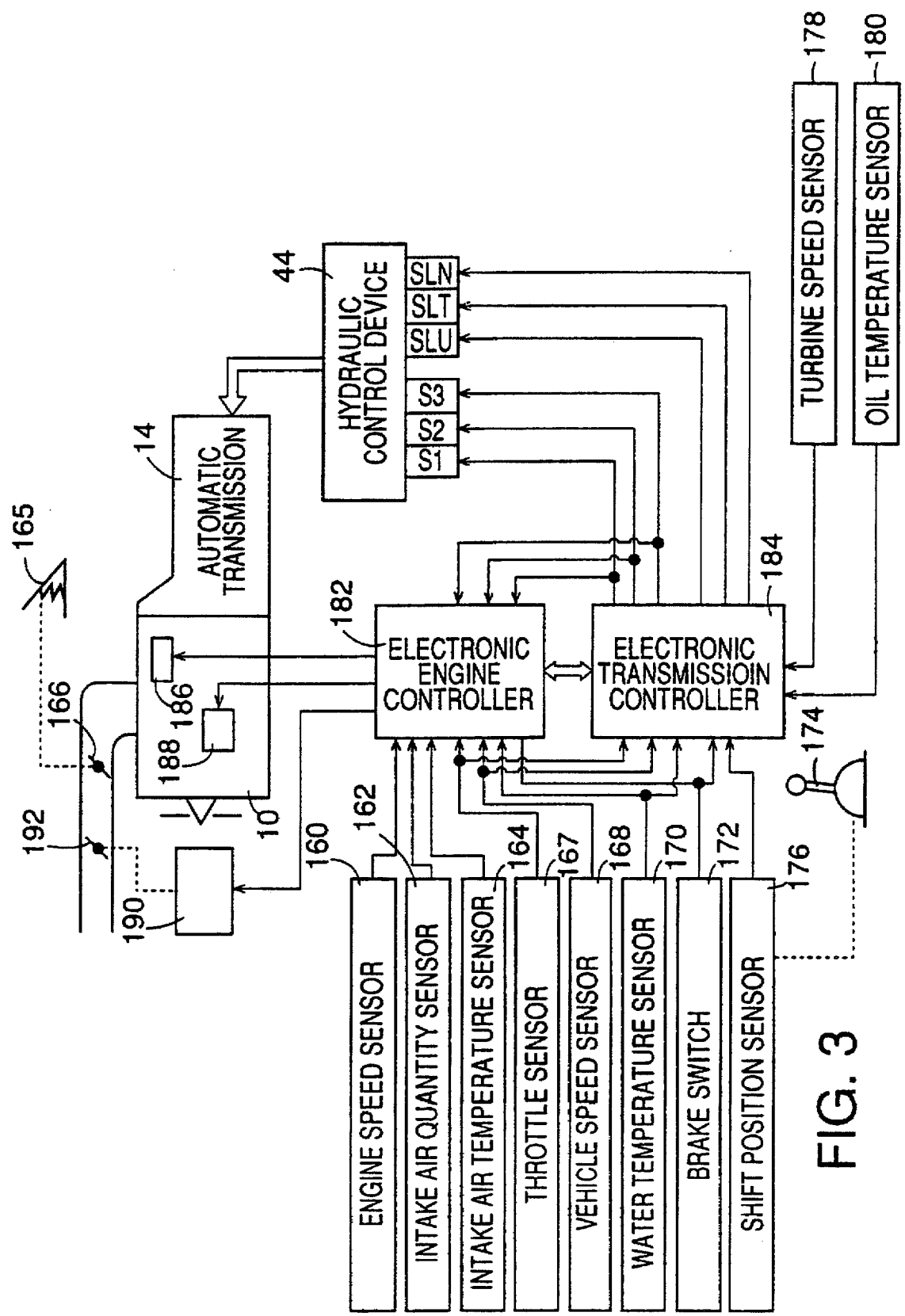
FIG. 3 is a block diagram showing a control system for the motor vehicle, which includes a transmission controller incorporating the slip control apparatus for the lock-up clutch.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening TAP of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed Nout of the output shaft 40 of the automatic transmission 40; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 40, namely, a currently selected one of the operating positions "L", "S", "D", "N", "R" and "P" of the shift lever 174; a turbine speed sensor 178 for detecting the speed $N_T$ of the turbine impeller 22, that is, the speed Nin of the input shaft 20 of the transmission 20; and an oil temperature sensor 180 for detecting a temperature $T_{OIL}$ of the working oil in the hydraulic control device 44. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening TAP and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 7:
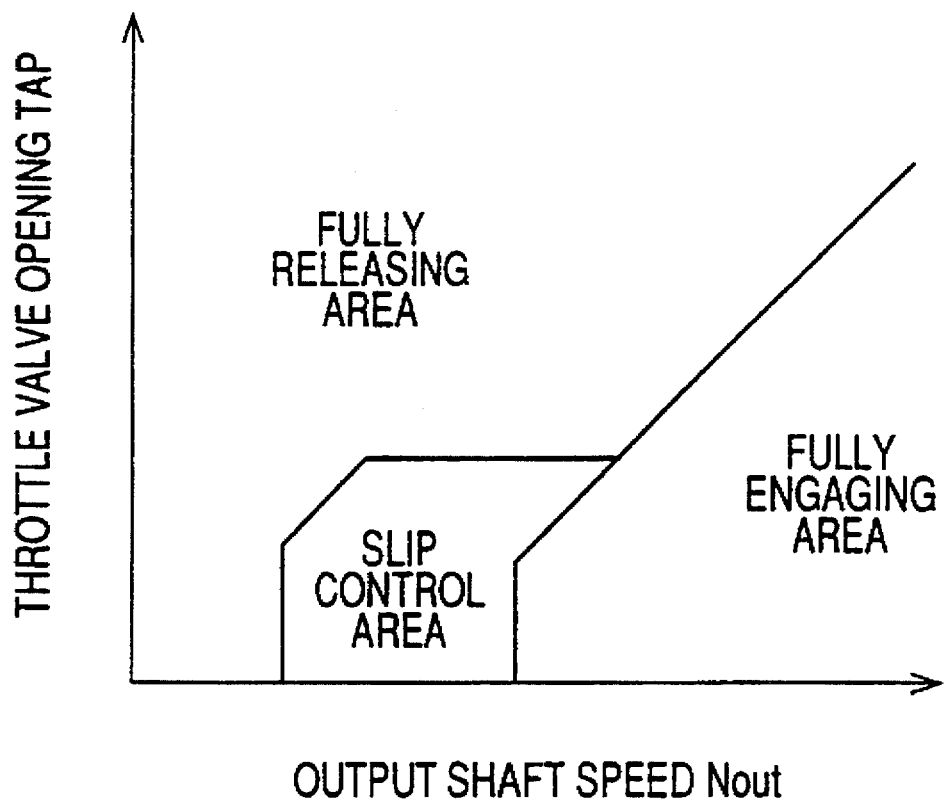
FIG. 7 is a view indicating boundaries defining different control areas of the lock-up clutch in relation to the running condition of the vehicle, which boundaries are stored in the slip control apparatus shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 7 are stored in the ROM. For instance, the boundaries are relationships between the throttle valve opening TAP and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening TAP and output speed Nout, one of the three control areas is determined or selected by the CPU of the transmission controller 184, according to the boundaries stored in the ROM.

When the vehicle running condition (TAP and Nout) is in the slip control area, the lock-up clutch 32 is controlled to be held in a partially slipping state for transmitting power of the engine 10 to the automatic transmission 14 so as to maximize the fuel economy of the vehicle while absorbing a torque variation of the engine 10 to assure high drivability of the vehicle. The determination as to whether the vehicle running condition falls in the slip control area according to the boundaries of FIG. 7 stored in the ROM is effected while the vehicle is accelerating. In this respect, it is noted that the amount of slip of the lock-up clutch 32 is also controlled while the vehicle is coasting or decelerating with the throttle valve 166 placed in the idling position. This slip control is effected to increase an effect of the fuel-cut control of the engine 10. In this case, however, the slip control area is determined on the basis of only the vehicle speed V, since the throttle opening TAP is zero during the coasting of the vehicle.

If the CPU of the controller 184 determines that the vehicle running condition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU, namely, a duty ratio $D_{SLU}$ of the valve SLU is adjusted according to the following equation (2) to control the amount of slip of the lock-up clutch 32 in a slip control mode:

$$D_{SLU}(=I_{SLU})=DFWD+KGD+DFB \qquad (2)$$

For instance, the duty ratio $D_{SLU}$ is calculated to zero an error $\Delta E$ ($=N_{SLP}$–TNSLP) between a target slip speed TNSLP and the actual slip speed $N_{SLP}$ ($=N_E$–$N_T$) of the lock-up clutch 32. The first term DFWD of the right member of the above equation (2) is a feed-forward control value, which varies as a function of the output torque of the engine 10, for example. The second term KGD is a learning control value which changes so as to reflect the varying characteristics of the lock-up clutch 32. The third term DFB is a feedback control value consisting of a proportional value, a differential value and an integral value of the control error $\Delta E$.

The feedback control value DFB is obtained according to the following equation (3):

$$DFB=K_P[\Delta E+(1/T1)\int\Delta E dt+T_D(d\Delta E/dt)] \qquad (3)$$

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting a fuel injection control for controlling a fuel injection valve 186 so as to optimize the combustion condition of the engine 10, an ignition control for controlling an ignitor 188 so as to optimize the ignition timing, a traction control for controlling a second throttle valve 192 via a throttle actuator 190 so as to control the traction force of the vehicle while preventing slipping of the drive wheels on the road surface, and a fuel-cut control for holding the fuel injection valve 186 closed while the engine speed $N_E$ is higher than a predetermined fuel-cut threshold level $N_{CUT}$ during coasting of the vehicle, so that the fuel economy of the vehicle is improved.

Referring next to the block diagrams of FIGS. 8A–8D, there will be described the functions of various functional means provided in the electronic transmission controller 184. The transmission controller 184 incorporates slip control means 196, slip-parameter monitoring means 198, summing means 200, defect detecting means 202, enabling means 206, speed-parameter monitoring means 208, smoothing means 210, hunting detecting means 212, engine speed variation determining means 214, turbine speed variation determining means 216, and hunting detecting means 218.

Figure 9:
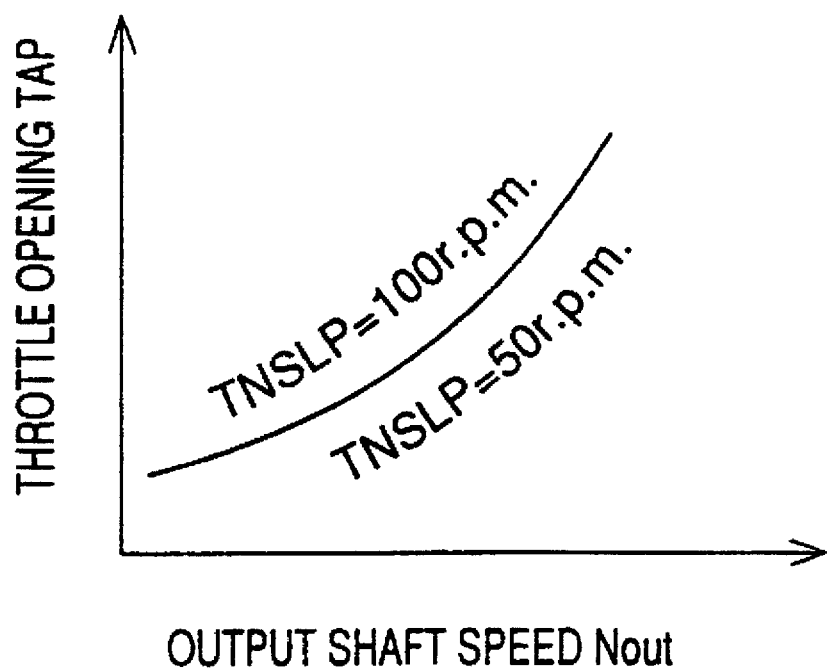
FIG. 9 is a graph indicating a relationship used to determine target slip speed $TN_{SLP}$ used for slip control of the lock-up clutch.

When the vehicle running condition is determined to fall in the slip control area explained above by reference to FIG. 7, the slip control means 196 applies the SLIP CONTROL current $I_{SLU}$ to the linear solenoid valve SLU, to control the amount of slip (slip speed $N_{SLP}=N_E-N_T$) of the lock-up clutch 32 such that the detected slip speed $N_{SLP}$ coincides with the target slip speed $TN_{SLP}$. To this end, the target slip speed $TN_{SLP}$ is determined on the basis of the throttle opening TAP and the output shaft speed Nout (corresponding to the vehicle running speed V), and according to the predetermined relationship between these parameters TAP, Nout and the target slip speed $TN_{SLP}$ as indicated in the graph of FIG. 9, by way of example. The SLIP CONTROL current $I_{SLU}$ corresponds to the duty ratio $D_{SLU}$ of the valve SLU calculated according to the above equation (2). It will be understood that the SLIP CONTROL current $I_{SLU}$ or the duty ratio $D_{SLU}$ of the linear solenoid valve SLU is considered to be the slip control output of the slip control means 196.

The slip-parameter monitoring means 198 is adapted to detect, as a parameter related to the slip of the lock-up clutch 32, the actual slip speed $N_{SLP}$ of the lock-up clutch 32 and the control error $\Delta E$ while the slip control means 196 is in operation. The summing means 200 is adapted to obtain a sum $SN_{SLP}$ of the slip speed values $N_{SLP}$ detected in successive cycles of execution of a diagnostic routine of FIG. 10 which will be described. The summing means 200 also obtains a sum $S\Delta E$ of the control errors $\Delta E$ detected in the successive cycles of execution of the diagnostic routine. The detect detecting means 202 determines the presence or occurrence of an "excessive engagement defect" and an "excessive release defect" of the lock-up clutch 32, on the basis of the obtained sum $SN_{SLP}$ or $S\Delta E$ as compared with a predetermined reference, as described below in detail by reference to the flow chart of FIG. 10. The enabling means 206 enables the defect detecting means 202 to operate while the duty ratio $D_{SLU}$ of the linear solenoid valve SLU as determined by the slip control means 196 is held within a predetermined range.

The speed-parameter monitoring means 208 is adapted to detect a speed-related parameter which varies due to hunting in the slip control of the lock-up clutch 32 by the slip control means 196. The parameter detected by the speed-parameter monitoring means 208 may be the engine speed $N_E$, slip speed $N_{SLP}$ or an amount of change of the control error $\Delta E=DN_{SLP}$. However, the turbine impeller speed $N_T$ cannot be used as the parameter, because it does not vary due to the slip control hunting while it vibrates due to juddering of the engine 10. The smoothing means 210 is adapted to smooth the output of the speed-parameter monitoring means 208. The hunting detecting means 212 determines the presence or occurrence of a hunting defect of the slip control means 196, on the basis of time periods CHGP and CHGM during which the amplitude of the output of the speed-parameter monitoring means 208 with respect to the smoothed value of the output.

The engine speed variation determining means 214 determines whether the amplitude of the variation of the engine speed $N_E$ is larger than a predetermined threshold. The turbine speed variation determining means 216 determines whether the amplitude of the variation of the speed $N_T$ of the turbine impeller 22 is larger than a predetermined threshold. Preferably, however, the turbine speed variation determining means 216 is adapted to determine whether the amplitude of the variation of a value ($N_T+TN_{SLP}$) is larger than a predetermined threshold. The hunting detecting means 218 determines the presence or occurrence of a hunting defect of the slip control means 196, if the amplitude of the variation of the engine speed $N_E$ is larger than the threshold when the amplitude of the variation of the turbine impeller speed $N_T$ or value ($N_T+TN_{SLP}$) is not larger than the threshold.

Figure 8A:
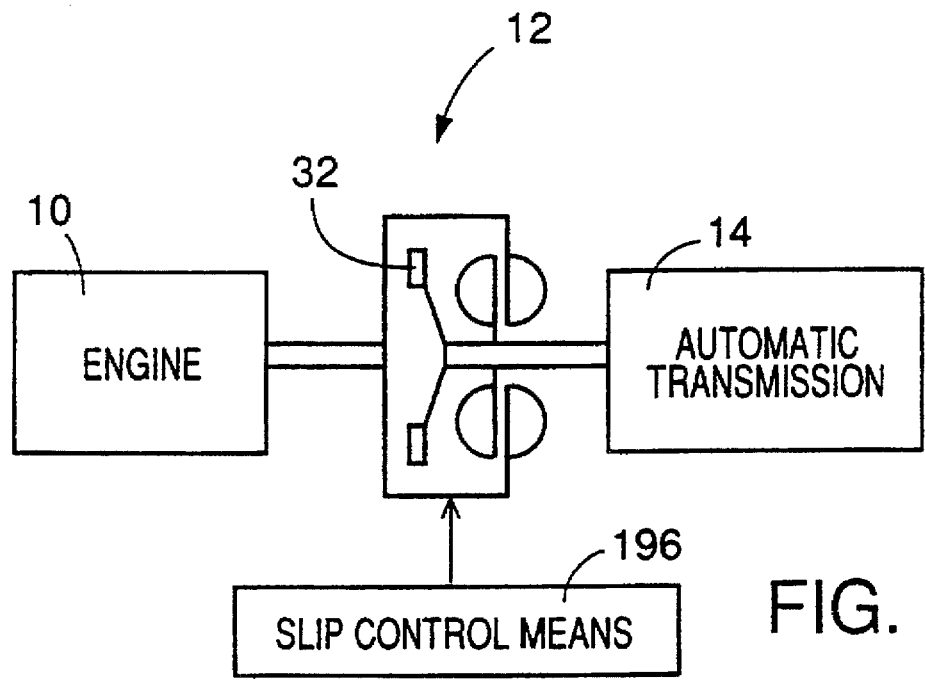
FIGS. 8A–8D are block diagrams illustrating the functions of various functional means incorporated in the slip control apparatus.
Figure 8B:
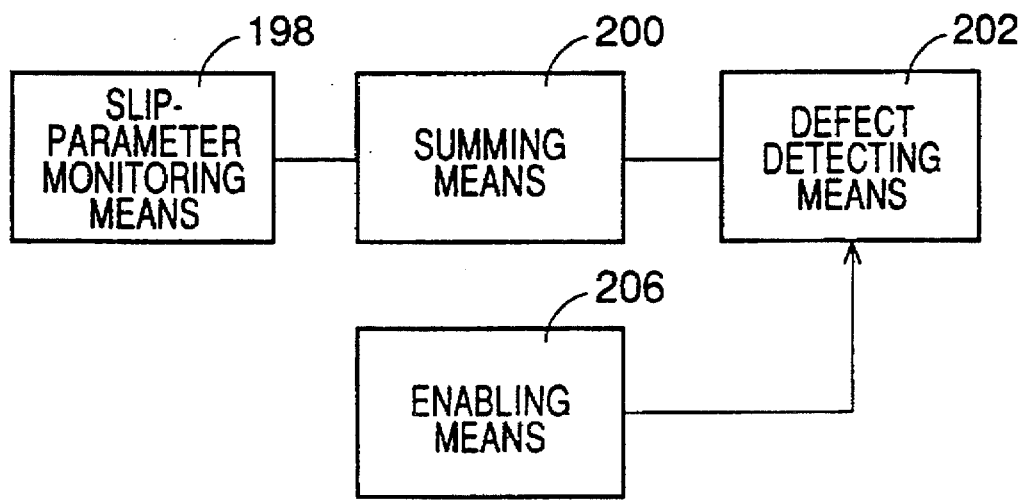
Figure 10:
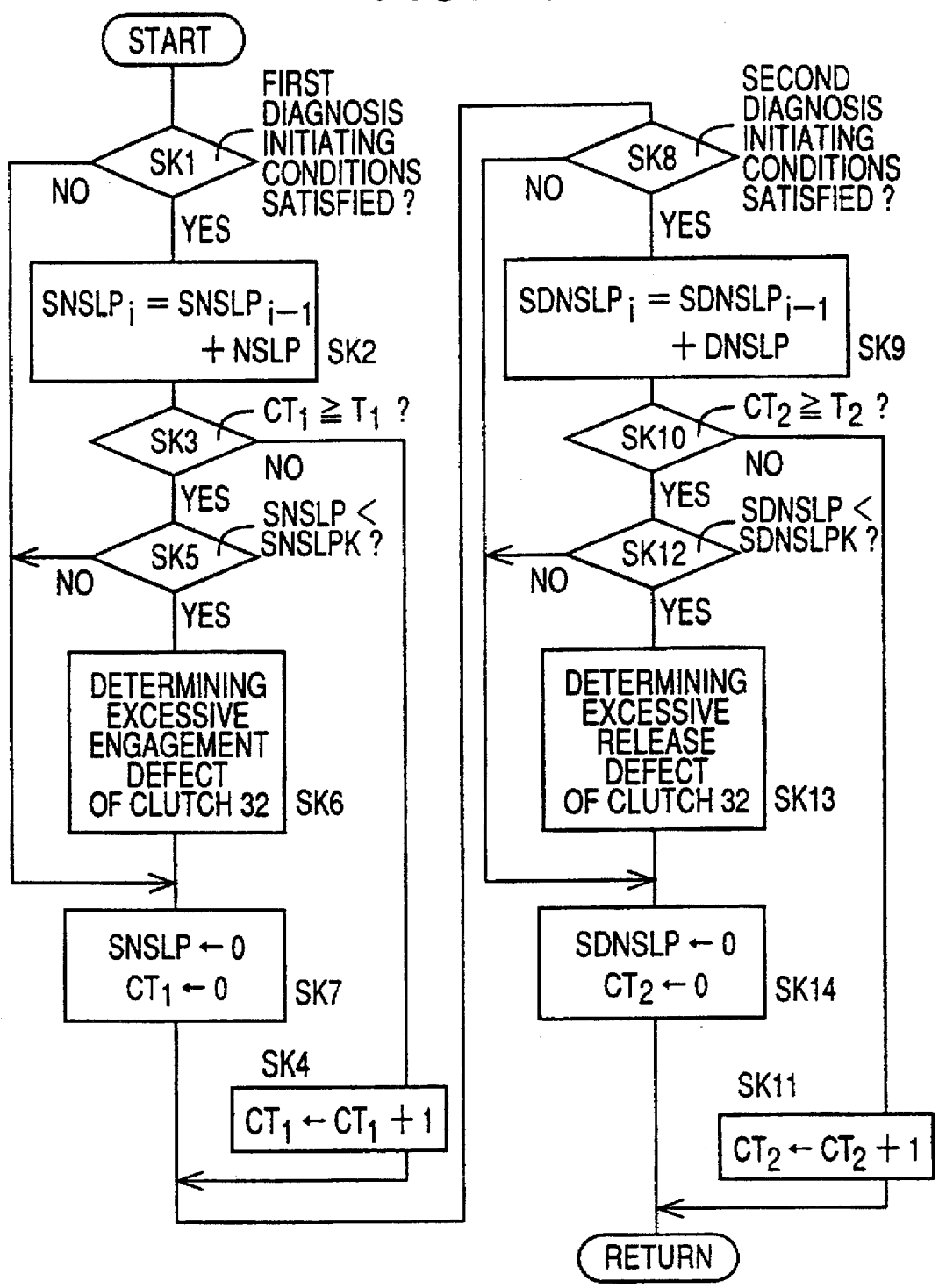
FIG. 10 is a flow chart illustrating a diagnostic routine for diagnosing the slip control of the lock-up clutch according to a first embodiment of the invention of FIG. 8B.

Reference is now made to the flow chart of FIG. 10, which shows the diagnostic routine executed by the transmission controller 184 according to a first embodiment of this invention schematically illustrated in FIG. 8B, for diagnosing the slip control of the lock-up clutch 32 to detect the excessive engagement defect and excessive release defect of the clutch 32. The routine includes steps SK1–SK7 for effecting a first diagnosis to detect the excessive engagement defect of the clutch 32, and steps SK8–SK14 for effecting a second diagnosis to detect the excessive release of the clutch 32.

The routine of FIG. 10 is initiated with step SK1 to determine whether first diagnostic conditions for initiating the first diagnosis are satisfied. These first diagnostic conditions include a condition that the engagement force of the lock-up clutch 32 determined by the duty ratio $D_{SLU}$ is smaller than a predetermined reference. For example, the engagement force is considered to be smaller than the reference if the duty ratio $D_{SLU}$ determined by the SLIP CONTROL current $I_{SLU}$ is higher than a predetermined reference, for instance, not lower than 80%. If an affirmative decision (YES) is obtained in step SK1, the following steps SK2–SK7 are implemented to effect the first diagnosis. Thus, step SK1 corresponds to the enabling means 206 which enables the defect detecting means 202 to operate while the duty ratio $D_{SLU}$ is 80% or higher. In other words, the first diagnosis to detect the excessive engagement defect of the lock-up clutch 32 is effected only when the engagement force of the clutch 32 as determined by the output of the slip control means 196 is smaller than the predetermined reference.

If a negative decision (NO) is obtained in step SK1, the control flow goes to step SK7 to reset the sum $SN_{SLP}$ and the content of a time counter CT1 to "0". Step SK7 is followed by step SK8 which will be described. With the affirmative decision (YES) obtained in step SK1, the control flow goes to step SK2 corresponding to the slip-parameter monitoring means 198 and summing means 200, wherein the actual slip speed $N_{SLP}$ of the lock-up clutch 32 is calculated, and the current sum $SN_{SLP}i$ of the slip speeds NSLP is calculated according to the following equation (4):

$$SNSLPi = SN_{SLPi-1} + NSLP$$

Step SK2 is followed by step SK3 to determine whether the content of the time counter CT1 is equal to or larger than a predetermined value T1. Initially, a negative decision (NO) is obtained in step SK3, and step SK4 is implemented to increment the time counter CT1. Step SK4 is followed by step SK8. The predetermined value T1 corresponds to a time period during which the actual slip speed values $N_{SLP}$ detected in successive cycles of execution of the routine are summed to obtain the sum $SN_{SLP}$. For example, the predetermined value T1 corresponds to about three seconds.

When the content of the time counter CT1 has reached the predetermined value T1 during repeated execution of the routine, an affirmative decision (YES) is obtained in step SK3, and the control flow goes to step SK5 to determine whether the sum $SN_{SLP}$ is smaller than a predetermined reference $SN_{SLPK}$. This reference $SN_{SLPK}$ is a lower limit of the sum $SN_{SLP}$ below which the engagement force of the lock-up clutch 32 is considered to be excessively large where the duty ratio $D_{SLU}$ is not lower than 80% (where the affirmative decision is obtained in step SK1). For example, the reference $SN_{SLPK}$ is set to be in the neighborhood of 10 ×T1 r.p.m.

If the slip control of the lock-up clutch 32 is normally effected by the slip control means 196, a negative decision (NO) is obtained in step SK5. In this case, step SK7 is implemented to reset the sum $SN_{SLP}$ and the time counter CT1. If the sum $SN_{SLP}$ of the successively obtained slip speed values $N_{SLP}$ is smaller than the lower limit $SN_{SLPK}$, it means that the engagement force of the clutch 32 is excessively larger than the value as attained according to the duty ratio $D_{SLU}$ corresponding to the SLIP CONTROL current $I_{SLU}$ generated by the slip control means 196. In this instance, step SK5 is followed by step SK6 to determine that there exists the excessive engagement defect of the lock-up clutch 32. This fact is stored in the transmission controller 184. Step SK6 is followed by step SK7. It will be understood that steps SK5 and SK6 correspond to the defect detecting means 202.

As indicated above, step SK7 is followed by step SK8 to determine whether second diagnostic conditions for initiating the second diagnosis are satisfied. These second diagnostic conditions include a condition that the engagement force of the lock-up clutch 32 determined by the duty ratio $D_{SLU}$ is larger than a predetermined reference. For example, the engagement force is considered to be larger than the reference if the duty ratio $D_{SLU}$ determined by the SLIP CONTROL current $I_{SLU}$ is lower than a predetermined reference, for instance, not higher than 40%. If an affirmative decision (YES) is obtained in step SK8, the following steps SK9–SK14 are implemented to effect the second diagnosis. Thus, step SK8 also corresponds to the enabling means 206 which enables the defect detecting means 202 to operate while the duty ratio $D_{SLU}$ is 40% or lower. In other words, the second diagnosis to detect the excessive release of the lock-up clutch 32 is effected only when the engagement force of the clutch 32 as determined by the output of the slip control means 196 is larger than the predetermined reference.

If a negative decision (NO) is obtained in step SK8, the control flow goes to step SK14 to reset the sum $SDN_{SLP}$ and the content of a time counter CT2 to "0". One cycle of execution of the routine of FIG. 10 is completed when step SK14 has been implemented. With the affirmative decision (YES) obtained in step SK8, the control flow goes to step SK9 corresponding to the slip-parameter monitoring means 198 and summing means 200, wherein the actual control error $DN_{SLP}$ is calculated, and the current sum $SDN_{SLP}i$ of the control error values $DN_{SLP}$ is calculated according to the following equation (5):

$$SDN_{SLPi} = SDN_{SLPi-1} + DN_{SLP}$$

Step SK9 is followed by step SK10 to determine whether the content of the time counter CT2 is equal to or larger than a predetermined value T2. Initially, a negative decision (NO) is obtained in step SK10, and step SK11 is implemented to increment the time counter CT2. Step SK11 is followed by step SK14. The predetermined value T2 corresponds to a time period during which the control error values $DN_{SLP}$ detected in successive cycles of execution of the routine are summed to obtain the sum $SDN_{SLP}$. For example, the predetermined value T2 corresponds to about three seconds.

When the content of the time counter CT2 has reached the predetermined value T2 during repeated execution of the routine, an affirmative decision (YES) is obtained in step SK10, and the control flow goes to step SK12 to determine whether the sum $SDN_{SLP}$ is larger than a predetermined reference $SDN_{SLPK}$. This reference $SDN_{SLPK}$ is an upper limit of the sum $SDN_{SLP}$ above which the engagement force of the lock-up clutch 32 is considered to be excessively small where the duty ratio $D_{SLU}$ is not higher than 40% (where the affirmative decision is obtained in step SK8). For example, the reference $SDN_{SLPK}$ is set to be in the neighborhood of 100×T1 r.p.m.

If the slip control of the lock-up clutch 32 is normally effected by the slip control means 196, a negative decision (NO) is obtained in step SK12. In this case, step SK14 is implemented to reset the sum $SDN_{SLP}$ and the time counter CT2, and one cycle of execution of the routine is completed. If the sum $SDN_{SLP}$ of the successively obtained control error values $DN_{SLP}$ is larger than the upper limit $SDN_{SLPK}$, it means that the engagement force of the clutch 32 is excessively smaller than the value as attained according to the duty ratio $D_{SLU}$ corresponding to the SLIP CONTROL current $I_{SLU}$ generated by the slip control means 196. In this instance, step SK12 is followed by step SK13 to determine that there exists the excessive release defect of the lock-up clutch 32. This fact is stored in the transmission controller 184. Step SK13 is followed by step SK14. It will be understood that steps SK12 and SK13 correspond to the defect detecting means 202.

If the excessive engagement defect or excessive release defect of the lock-up clutch 32 is detected by the defect detecting means 202, the lock-up relay valve 52 is turned OFF and the slip control of the lock-up clutch 32 by the slip control means 196 is terminated.

In the present first embodiment of FIGS. 8B and 10, the slip-parameter monitoring means 198 detects the slip speed $N_{SLP}$ in step SK2 and the control error $DN_{SLP}$ in step SK9, during the slip control of the lock-up clutch 32 by the slip control means 196, and the summing means 200 obtains the sum $SN_{SLP}$ in step SK2 and the sum $SDN_{SLP}$ in step SK9. The defect detecting means 202 determines in step SK5 the presence of the excessive engagement defect of the clutch 32 on the basis of the sum $SN_{SLP}$ as compared with the predetermined lower limit $SN_{SLPK}$, and in step SK12 the presence of the excessive release defect of the clutch 32 on the basis of the sum $SDN_{SLP}$ as compared with the upper limit $SDN_{SLPK}$. Thus, the present routine permits reliable detection of defects of the lock-up clutch 32 associated with the slip control of the clutch 32, even when the slip speed $N_{SLP}$ vibrates along a waviness curve, that is, even where the time period during which the slip speed $N_{SLP}$ is held outside a permissible or normal range does not exceed a predetermined time.

Figure 11:
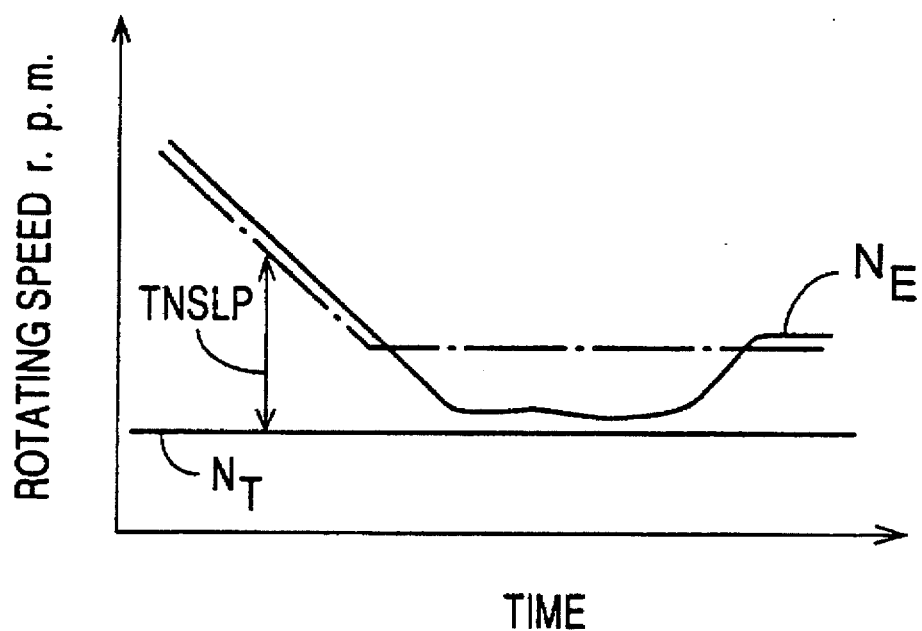
FIG. 11 is a graph indicating an overshoot of engine speed $N_E$ upon changing of the target slip speed $TN_{SLP}$, which may cause erroneous detection of a defect associated with the slip control of the lock-up clutch.

It is noted that the present embodiment is adapted to effect the first diagnosis (SK2-SK7) only when the engagement force of the clutch 32 as determined by the duty ratio $D_{SLU}$ is smaller than the predetermined reference, for example, only when the duty ratio $D_{SLU}$ is higher than a predetermined value (80% or more). Similarly, the second diagnosis (SK9-SK14) is effected only when the engagement force as determined by the duty ratio $D_{SLU}$ is larger than the predetermined reference, for example, only when the duty ration $D_{SLU}$ is smaller than a predetermined value (40% or less). In other words, the enabling means 206 permits the defect detecting means 202 to operate to effect the first diagnosis for the excessive encagement force of the clutch 32 only when the clutch 32 is commanded to have a relatively high slip speed $N_{SLP}$, and to effect the second diagnosis for the excessive release of the clutch 32 only when the clutch 32 is commanded to have a relatively low slip speed $N_{SLP}$. This arrangement is effective to further improve the diagnosing accuracy and reliability, more specifically, to prevent erroneous determination by the defect detecting means 202. In this respect, reference is made to the graph of FIG. 11, which shows a variation of the engine speed $N_E$ in the case where the target slip speed $TN_{SLP}$ is continuously reduced to a given value and is then kept at that value. In this case, the engine speed $N_E$ is likely to undergo an overshoot, that is, drop far below the desired level determined by the target slip speed $TN_{SLP}$, as indicated in the graph, even when the amount of slip of the lock-up clutch 32 is normally controlled by the slip control means 196. In this case, the defect detecting means 202 would erroneously determine that the engagement force of the clutch 32 is excessive with the slip speed $N_{SLP}$ lower than required, if the enabling means 206 or step SK1 were not provided. The present embodiment is free from such erroneous determination of the excessive engagement defect of the clutch 32.

In the present embodiment, the lock-up relay valve 52 is turned OFF and the slip control by the slip control means 196 is terminated in the event of determination of the presence of the excessive engagement defect or excessive release defect of the clutch 32 by the defect detecting means 202. This arrangement permits the lock-up clutch 32 to be fully released even if the spool 136 of the lock-up clutch control valve 56 is stuck at a position between its stroke ends corresponding to the fully engaged and released states of the clutch 32.

Referring next to the flow chart of FIG. 12, there will be described the diagnostic routine executed by the transmission controller 184 according to a second embodiment of the invention schematically illustrated in FIG. 8C, for detecting a hunting defect of the slip control of the clutch 32.

Figure 12:
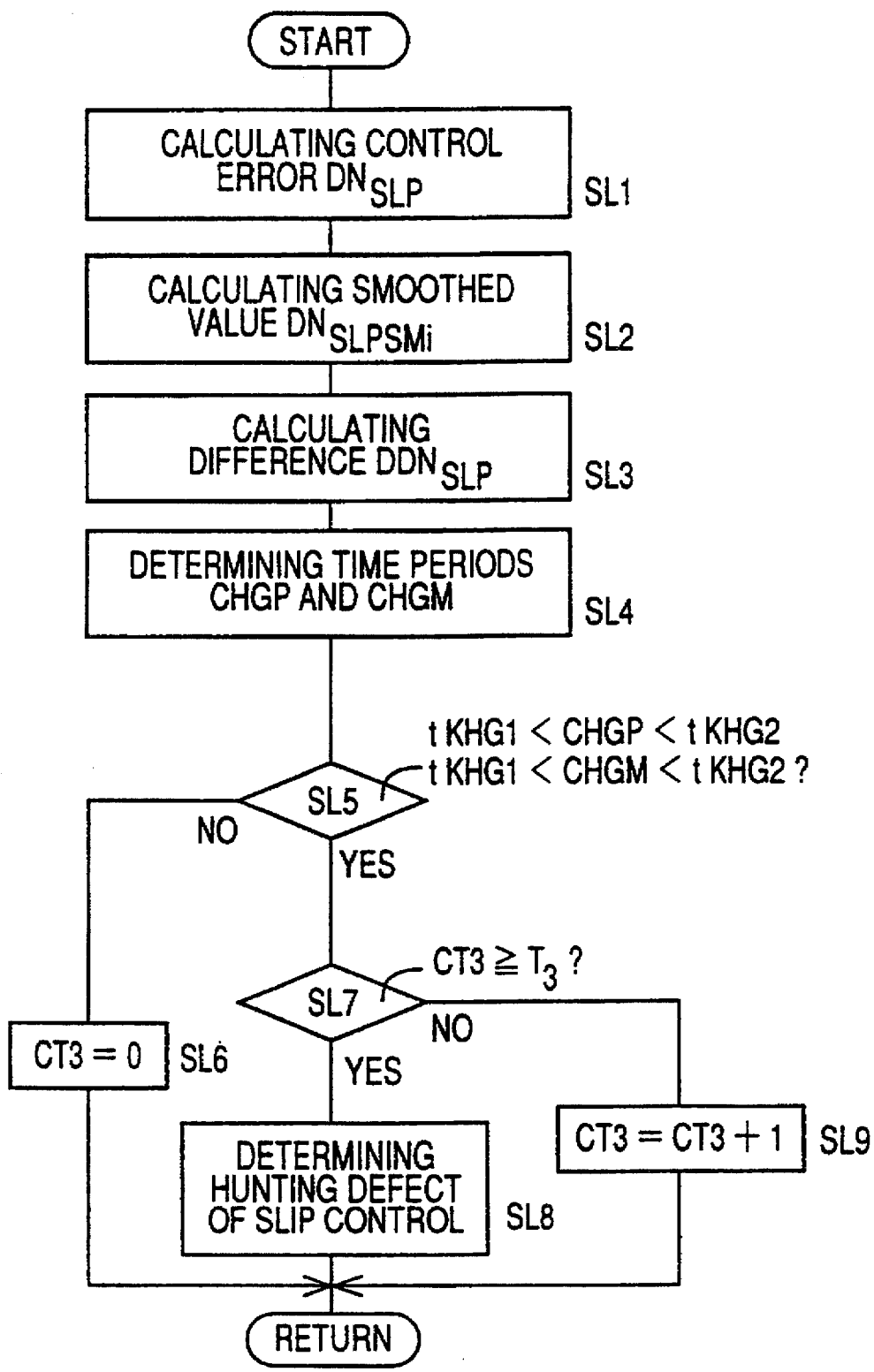
FIG. 12 is a flow chart illustrating a diagnostic routine for diagnosing the slip control of the lock-up clutch according to a second embodiment of this invention of FIG. 8C.
Figure 13:
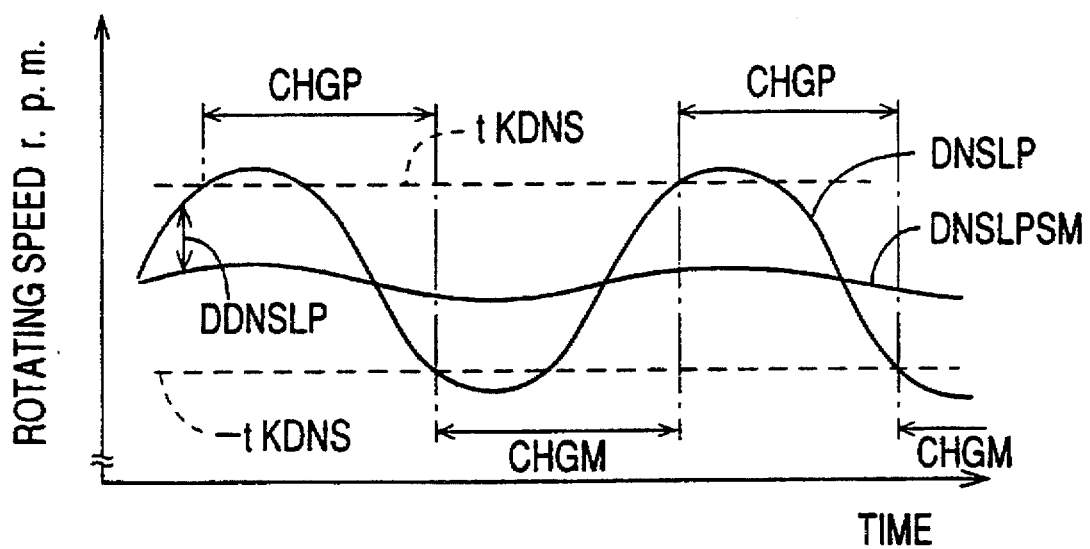
FIG. 13 is a graph indicating a variation of control error $DN_{SLP}$ with respect to smoothed control error value $DN_{SLPSM}$.

The routine of FIG. 12 is initiated with step SL1 corresponding to the speed-parameter monitoring means 208, to calculate the control error $DN_{SLP}$ as a speed-related parameter which varies due to hunting in the slip control of the lock-up clutch 32, as indicated in FIG. 13. Step SL1 is followed by step SL2 corresponding to the smoothing means 210, to smooth the control error $DN_{SLP}$ to obtain a smoothed value $DNS_{LPSM}$ (FIG. 13), that is to calculate the smoothed value $DN_{SLPSMi}$ according to the following equation (6):

$$DN_{SLPSMi} = DN_{SLPSMi-1} + (DN_{SLP} - DN_{SLPSMi-1})/16 \qquad (6)$$

Step SL2 is followed by step SL3 to calculate a difference $DDN_{SLP}$ (FIG. 13) of the actual control error $DN_{SLP}$ with respect to the smoothed value $DN_{SLPSM}$, according to the following equation (7):

$$DDN_{SLP} = DN_{SLP} - DN_{SLPSM} \qquad (7)$$

Step SL3 is followed by step SL4 to determine a time period CHGP between a moment when the difference $DDM_{SLP}$ has increased to a predetermined limit tKDNS and a moment when the difference $DDN_{SLP}$ has been reduced to a predetermined limit -tKDNS, and the following time period CHGM until the difference $DDN_{SLP}$ has increased again to the limit tKDNS, as indicated in the graph of FIG. 13. Step SL4 is followed by step SL5 to determine whether each of the time periods CHGP and CHGM is within a predetermined reference range between tKHG1 and tKHG2. Each of these time periods CHGP and CHGM corresponds to a half of the period of hunting of the control error $DN_{SLP}$.

If a negative decision (NO) is obtained in step SL5, the control flow goes to step SL6 to reset a time counter CT3 to "0". If an affirmative decision (YES) is obtained in step SL5, the control flow goes to step SL7 to determine whether the content of the time counter CT3 is equal to or larger than a predetermined value T3. If a negative decision (NO) is obtained in step SL7, step SL9 is implemented to increment the time counter CT3. With the routine of FIG. 12 repeatedly executed, an affirmative decision (YES) is obtained in step SL7, and the control flow goes to step SL8 to determine that there exists a hunting defect in the slip control of the lock-up clutch 32 by the slip control means 196. That is, the hunting defect is detected if the affirmative decision (YES) is obtained in step SL5 for a predetermined time corresponding to the predetermined value T3. In this case, the lock-up relay valve 55 is turned OFF to terminate the slip control by the slip control means 196, and the lock-up clutch 32 is brought to its fully released state.

It will be understood that steps SL3–SL5 and SL7–SL9 correspond to the hunting detecting means 212.

Figure 8C:
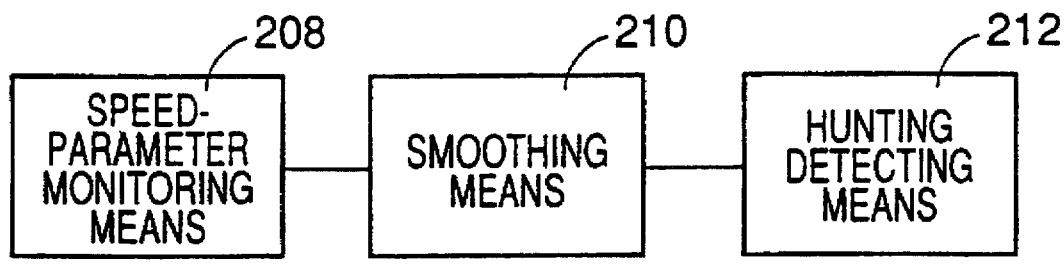

In the present second embodiment of FIGS. 8C and 12, the control error $DN_{SLP}$ (=$\Delta E$) during the slip control of the lock-up clutch 32 by the slip control means 196 is detected in step SL1 by the speed-parameter monitoring means 208, as a parameter which varies due to hunting of the slip control of the lock-up clutch 32. The control error $DN_{SLP}$ is smoothed in step SL2 by the smoothing means 210 to obtain the smoothed value $DN_{SLPSM}$. On the basis of the difference $DDN_{SLP}$ between the control error $DN_{SLP}$ and the smoothed value $DN_{SLPSM}$, the hunting detecting means 212 determines the presence of the hunting defect in the slip control of the clutch 32, by implementing steps SL3–SL5 and SL7–SL9. Thus, the present embodiment permits reliable detection of the hunting defect even where the time period during which the slip speed $N_{SLP}$ is held outside a permissible or normal range does not exceed a predetermined time.

Referring next to the flow chart of FIG. 14, there will be described the diagnostic routine according to a third embodiment of this invention schematically illustrated in FIG. 8D, for detecting the hunting defect on the basis of a variation of the engine speed $N_E$.

Figure 14:
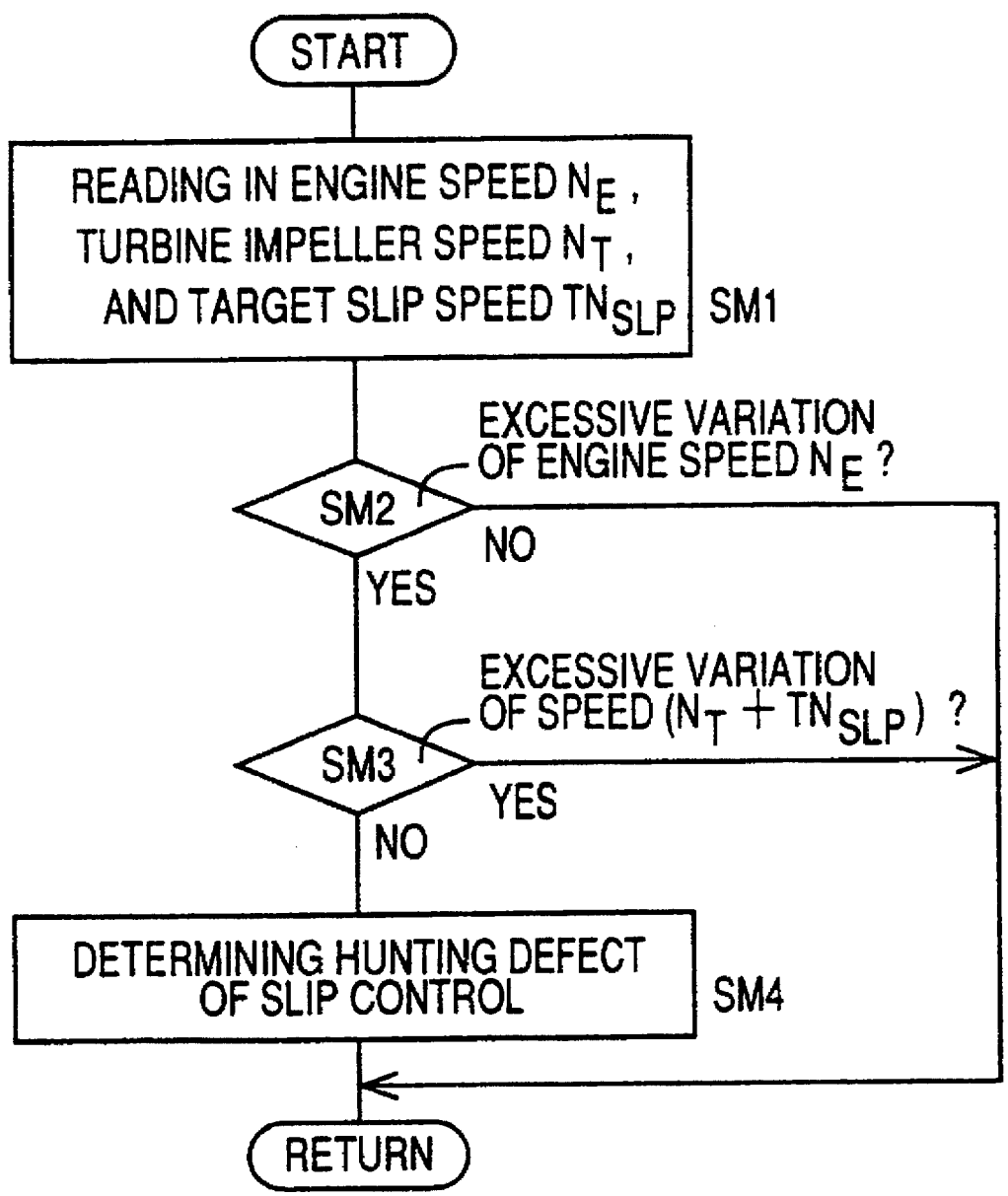
FIG. 14 is a flow chart illustrating a diagnostic routine for diagnosing the slip control of the lock-up clutch according to a third embodiment of the invention of FIG. 8D.

The routine of FIG. 14 is initiated with step SM1 to read in the speed $N_E$ of the engine 10, speed $N_T$ of the turbine impeller 22 and target slip speed $TN_{SLP}$. Step SM1 is followed by step SM2 corresponding to the engine speed variation determining means 214, to determine whether the amplitude of a variation of the engine speed $N_E$ is larger than a predetermined reference. If an affirmative decision (YES) is obtained in step SM2, the control flow goes to step SM3 corresponding to the turbine speed variation determining means 216, to determine whether the amplitude of a variation of the speed $N_T+TN_{SLP}$ is larger than a predetermined reference. If a negative decision (NO) is obtained in step SM3, that is, if the variation of the engine speed $N_E$ is excessive while the variation of the speed $N_T+TN_{SLP}$ is not excessive, the control flow goes to step SM4 corresponding to the hunting detecting means 218, to determine the presence of the hunting defect in the slip control of the lock-up clutch 32. In this case, the lock-up relay valve 52 is turned OFF to terminate the slip control of the clutch 32, and the clutch 32 is brought to the fully released state.

The determination in step SM2 may be made by comparing the engine speed $N_E$ or the speed $(N_T+TN_{SLP})$ with a smoothed value thereof.

Figure 15:
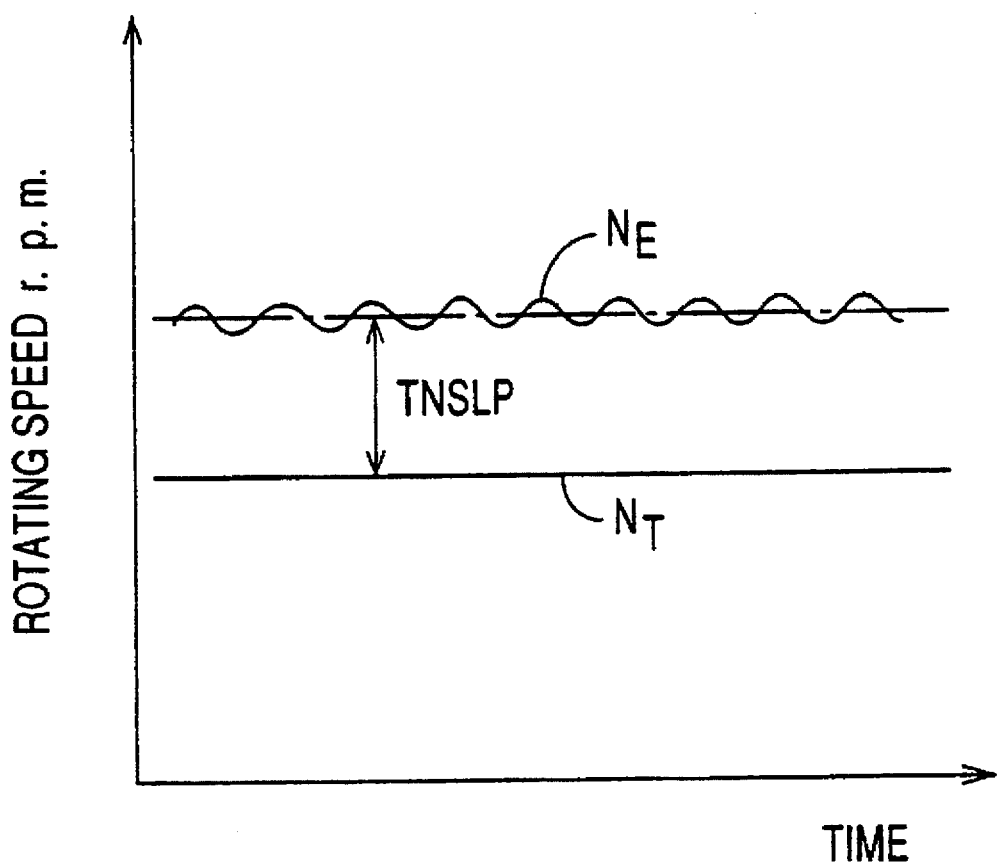
FIG. 15 is a time chart indicating hunting of the engine speed $N_E$ which is detected in the embodiment of FIG. 14.

In the present third embodiment, the hunting defect is detected if the variation of the engine speed $N_E$ is excessively large while the variation of the sum of the turbine impeller speed $N_T$ and the target slip speed $TN_{SLP}$ is not excessively large. This arrangement is effective to prevent erroneous determination of the hunting detect, which would be made in the case of an instantaneous variation in the turbine impeller speed $N_T$ due to a variation in the speed of the drive wheels. In this respect, it is noted that the hunting in the slip control of the lock-up clutch 32 involves only a periodic variation in the engine speed $N_E$, but substantially no variation in the turbine impeller speed $N_T$, as indicated in the graph of FIG. 15.

The present embodiment is adapted to determine whether the amplitude of the variation of the speed $N_T+TN_{SLP}$ is larger than the reference value, and the hunting defect is not detected if the variation of the speed $N_T+TN_{SLP}$ is larger than the reference even if the variation of the engine speed $N_E$ is excessive. This arrangement is effective to prevent erroneous determination of the hunting defect, which would be made due to a change or updating of the target slip speed $TN_{SLP}$ depending upon the vehicle running condition.

While the present invention has been described above in detail in its presently preferred embodiments by reference to the accompanying drawings, it is to be understood that the invention is not limited to the details of the illustrated embodiments, but may be otherwise embodied.

In the first embodiment of FIGS. 8B and 10, the first and second diagnoses to detect the excessive engagement and excessive release defects are permitted to be effected only while the duty ratio $D_{SLU}$ are held within the respective predetermined ranges (80–100%, and 0–40%), namely, only when the affirmative decision (YES) is obtained in steps SK1 and SK8, respectively. However, these steps SK1 and SK8 are not essential, or the enabling means 206 is not essential.

While the sums $SN_{SLP}$ and $SDN_{SLP}$ used in the first and second diagnoses are obtained during the different time periods corresponding to the predetermined count values T1 and T2 of the time counters CT1 and CT2, these time periods may be the same period. Further, the sum $SN_{SLP}$ may be used in both of the first and second diagnoses. In this case, the absolute value of the sum $SN_{SLP}$ is compared with a common reference in step SK5 and SK12.

The routine of FIG. 10 may be modified such that the sum $SDN_{SLP}$ of the control values $DN_{SLP}$ is used in the first diagnosis (step SK5) to detect the excessive release defect of the clutch 32 while the sum $SN_{SLP}$ of the slip speed values $N_{SLP}$ is used in the second diagnosis (step SK12) to detect the excessive engagement defect of the clutch 32.

Although the second embodiment of FIGS. 8C and 12 uses the control error $DN_{SLP}$ and its smoothed value $DN_{SLPSM}$, the second embodiment may be modified to use the engine speed $N_E$ and its smoothed value $N_{ESM}$, or the slip speed NSLP and its smoothed value $N_{SLPSM}$.

Figure 8D:
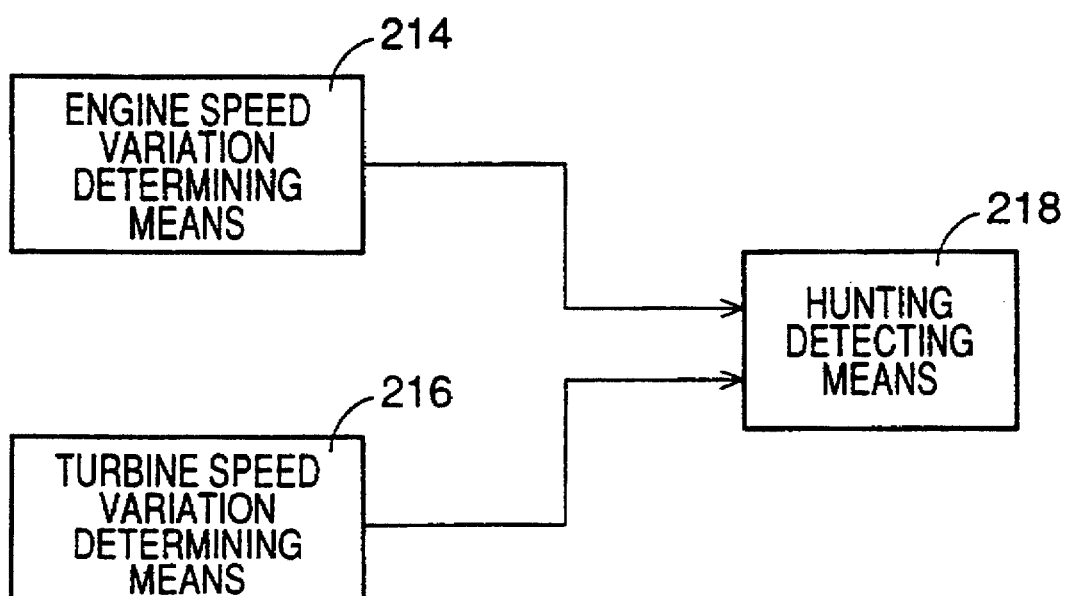

In the third embodiment of FIGS. 8D and 14, step SM3 is provided to determine whether the amplitude of variation of the sum $N_T+TN_{SLP}$ is larger than a predetermined reference. This step SM3 may be modified to determine whether the amplitude of variation of the turbine impeller speed $N_T$ is larger than a predetermined reference.

In the third embodiment, the output of the turbine speed sensor 178 is directly used by the turbine speed variation determining means 216 to detect the speed $N_T$ of the turbine impeller 22 in step SM1 or to obtain the sum $N_T+TN_{SLP}$ in step SM3. The turbine impeller speed $N_T$ is equal to the speed Nin of the input shaft 20 of the automatic transmission 14. However, the turbine impeller speed $N_T$ may be calculated by using other speed sensors such as the vehicle speed sensor 168 adapted to detect the speed Nout of the output shaft 40 of the transmission 14, or a wheel speed sensor adapted to detect the rotating speed of a vehicle wheel. Where the vehicle speed sensor 168 is used, the turbine impeller speed $N_T$ may be calculated by multiplying the output shaft speed Nout of the transmission 14 by a currently selected speed ratio of the transmission 14. Where the wheel speed sensor is used, the turbine impeller speed $N_T$ may be calculated by multiplying the wheel speed by the speed ratio of the transmission 14 and the speed reduction ratio of the final gear device. In these cases where the turbine impeller speed $N_T$ is calculated from the speed Nout or wheel speed, the turbine speed sensor 178 may be eliminated.

It is to be understood that the present invention may be embodied with various other changes, modifications and improvements, which may occur to those skilled in the art, without departing from the spirit and scope of the invention defined in the following claims.

What is claimed is:

1. An apparatus including slip control means for controlling an amount of slip of a lock-up clutch disposed between a pump impeller and a turbine impeller in a power transmission system of a motor vehicle, such that an actual slip speed of said lock-up clutch coincides with a target slip speed, said apparatus comprising:

speed-parameter monitoring means for detecting a selected speed-related parameter which varies due to hunting in slip control of said lock-up clutch by said slip control means, while said slip control means is in operation;

smoothing means for smoothing said speed-related parameter detected by said speed-parameter monitoring means, to obtain a smoothed speed-related value; and hunting detecting means for determining the presence or absence of a hunting defect in slip control of said lock-up clutch by said slip control means, on the basis of a difference of said speed-related parameter from said smoothed speed-related value.

2. An apparatus according to claim 1, wherein said hunting detecting means determines the presence or absence of said hunting defect if said difference is held within a predetermined range for more than a predetermined length of time.

3. An apparatus according to claim 1, wherein said hunting detecting means commands said slip control means to fully release said lock-up clutch if said hunting detecting means determines the presence of said hunting defect.

4. An apparatus according to claim 1, wherein said speed-parameter monitoring means detects a speed-related parameter which is selected from the group consisting of: a speed of an engine of the vehicle connected to said pump impeller; said actual slip speed of said lock-up clutch; and a control error between said actual and target slip speeds of said lock-up clutch.

5. An apparatus according to claim 4, wherein said speed-related parameter is said control error.

* * * * *